United States Patent [19]

Rohs

[11] Patent Number: 4,623,157
[45] Date of Patent: Nov. 18, 1986

[54] JAW FOR CHUCKING DEVICES

[75] Inventor: Hans-Günther Rohs, Rechberghausen, Fed. Rep. of Germany

[73] Assignee: Oerlikon-Boehringer GmbH, Goppingen, Fed. Rep. of Germany

[21] Appl. No.: 610,297

[22] PCT Filed: Sep. 7, 1983

[86] PCT No.: PCT/EP83/00233
§ 371 Date: May 2, 1984
§ 102(e) Date: May 2, 1984

[87] PCT Pub. No.: WO84/01116
PCT Pub. Date: Mar. 29, 1984

[30] Foreign Application Priority Data

Sep. 13, 1982 [DE] Fed. Rep. of Germany ....... 3233915

[51] Int. Cl.[4] ............................................. B23B 31/10
[52] U.S. Cl. ................................... 279/123; 279/1 Q; 279/1 SJ
[58] Field of Search ................. 279/123, 155, 1 R, 1 Q

[56] References Cited

U.S. PATENT DOCUMENTS

| | | | |
|---|---|---|---|
| 2,666,352 | 1/1954 | Philips | 279/1 SJ |
| 2,778,652 | 1/1957 | Ingwer et al. | 279/123 |
| 2,788,216 | 4/1957 | Chasar | 279/123 |
| 2,811,366 | 10/1957 | Chasar | 279/123 |
| 3,020,058 | 2/1962 | Feldman | 279/123 |
| 3,090,614 | 5/1963 | Freeman et al. | 279/123 X |
| 3,215,010 | 11/1965 | Montgomery et al. | 279/123 X |
| 3,248,120 | 4/1966 | Volpe | 279/123 X |
| 3,606,968 | 9/1971 | Loyd | 279/1 SJ X |
| 4,155,563 | 5/1979 | Shupp et al. | 279/1 SJ X |
| 4,222,577 | 9/1980 | Giffin | 279/1 SJ X |
| 4,431,202 | 2/1984 | Swenson | 279/123 X |
| 4,513,980 | 4/1985 | Kruse | 279/123 X |
| 4,536,000 | 8/1985 | Rohm | 279/123X |

Primary Examiner—Gil Weidenfeld
Assistant Examiner—Glenn L. Webb

[57] ABSTRACT

A jaw for chucking devices, especially multiple-jaw chucks of machine tools, for example, for chucking workpieces having surfaces curved in only one direction, especially workpieces having round chucking surfaces. The contact face of the jaw is provided on a chucking element consisting of hard but flexible material to which the chucking force is applied in at least one line parallel to the curved surface of the workpiece.

7 Claims, 4 Drawing Figures

JAW FOR CHUCKING DEVICES

The invention concerns a chuck jaw especially for multiple-jaw chucks of machine tools, for example, for the chucking of workpieces having surfaces curved in only one direction, especially workpieces having round chucking surfaces.

It is known to perform the mounting of workpieces having nonplanar surfaces, particularly those having surfaces curved in one direction, such as round workpieces, for example, which are already finished and must not be marred, by means of chuck jaws which either consist wholly or partially of a material that is so soft that it cannot damage the workpiece surface, or are precisely fitted to the shape of the workpiece that is to be machined.

When chucking with jaws of soft material, the chucking force to be applied is limited by the compressive strength of this material. This strength, however, often does not suffice to withstand the forces produced by the machining operation. Therefore, jaws are usually used which are fitted precisely to the shape of the workpiece. The production and storage of such jaws, however, is difficult, because separate jaws must be made for each workpiece of different shape or size, and in some cases have to be stored for later reuse.

It is the object of the invention to construct the jaws of the kind described above such that a high chucking force can be applied to workpieces having nonplanar surfaces, without marring the workpiece surface.

This object is achieved in accordance with the invention by providing the contact face of the jaw on a jaw facing element consisting of hard but flexible material, to which the chucking force is applied in at least one line parallel to the curved surface of the workpiece.

On the basis of the flexibility properties of the jaw facing element on which the contact surface of the vice jaw is disposed, the contact surface of the jaw can adapt to the workpiece surface, so that a large-area contact is achieved even though the chucking force of the jaw is transmitted to the jaw facing element along only one line. An important advantage is to be seen in the fact that the same jaw can be used for workpieces of different curvature, i.e., on cylindrical workpieces of different diameters, since the jaw plate can adapt to different workpiece surfaces.

The jaw facing element consists preferably of a jaw plate, e.g., a steel plate, to which the jaw transfers the chucking force. This transfer can be performed through at least one web which, in the case of a round workpiece for example, is disposed parallel to the axis of curvature of the workpiece surface. In the case of concave workpieces, a single web engaging the center of the jaw plate will suffice, so that the jaw plate adapts to the shape of the concave workpiece beginning at this center.

In the case of convex workpieces, it is advantageous to provide two webs which attack laterally in the area of the ends of the jaw plate.

The jaw plate and the webs can be made integral with the jaw, i.e., can be made from the material of the jaw.

It is also possible to transfer the chucking force to the jaw through bolsters disposed parallel to the axis of curvature of the workpiece surface and are best partially embedded in the jaw. In this case a foam insert can be provided between the jaw and the jaw plate, which is fastened by cementing to the jaw and the jaw plate and thus holds the jaw plate.

The invention will be explained below by means of examples, with the aid of FIGS. 1 to 4, wherein.

Figure 1:
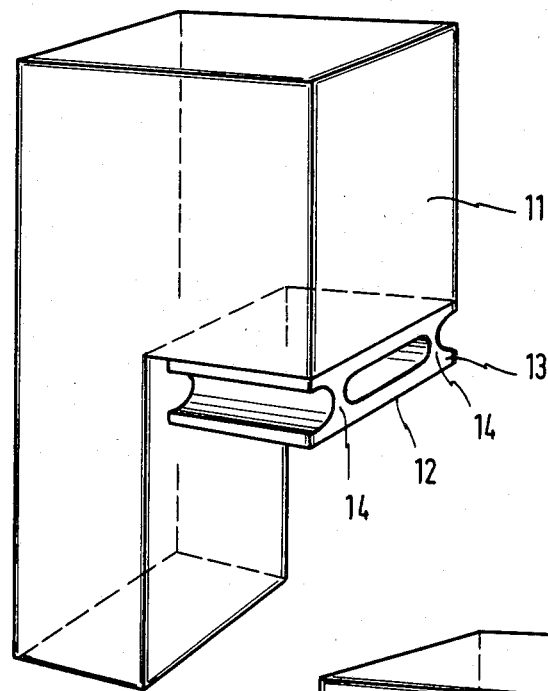
FIGS. 1 and 3 represent jaws for workpieces of convex surface.

FIG. 1 shows diagrammatically a jaw to which, for the chucking of workpieces of convex surface, a jaw facing element in the form of a plate 13 is fastened, whose bottom serves as the jaw face 12. The jaw plate 13 is joined to the jaw 11 by two webs 14, The webs 14 and the plate 13 are made integral with the jaw 11, i.e., the webs and the plate are made from the material of the jaw and, like the latter, consist of steel.

The thickness of the jaw plate 13 is selected such that the face 12 of the jaw 11 adapts itself to the workpiece surface. The webs 14 run along a line that is parallel to the radius of curvature of the workpiece, i.e., in the case of a cylindrical workpiece, for example, parallel to its generatrices. When a cylindrical workpiece of this kind is chucked in a conventional three-jaw chuck whose jaws are of the configuration shown in FIG. 1, the jaw plate 13 adapts itself between the webs 14 to the shape of the workpiece, so that a broad-surface contact results, and marring of the finished workpiece is prevented. Since the jaw plate 13 is made of a relatively hard material, it is possible to transmit sufficiently high chucking forces.

Figure 2:
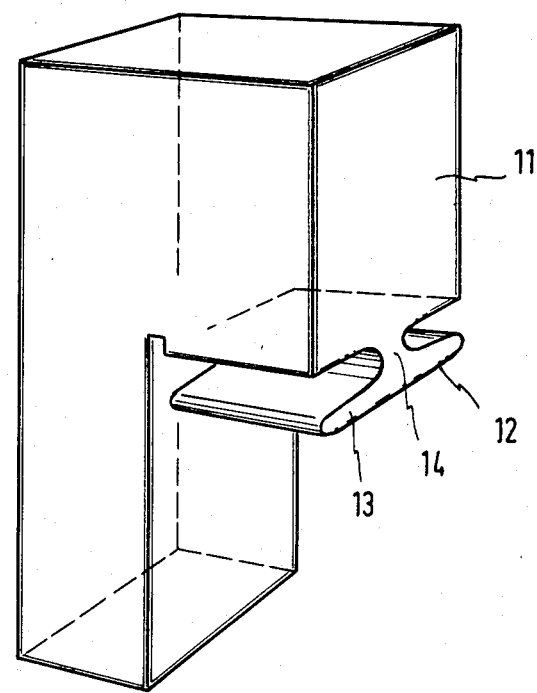
FIGS. 2 and 4 represent jaws for workpieces of concave surface.

FIG. 2 shows a jaw for chucking workpieces of concave contact surface. In this case only one web 14 is present, approximately in the center of the jaw plate, so that the jaw plate adapts itself to the tool shape mainly towards its lateral extremities.

Figure 3:
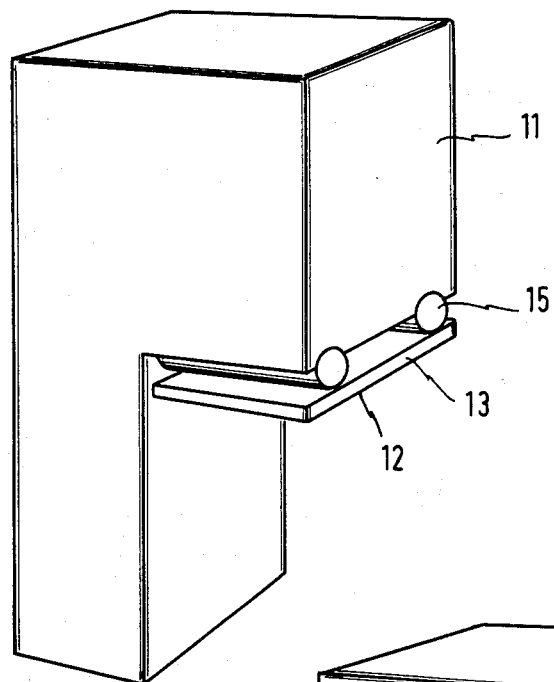
Figure 4:
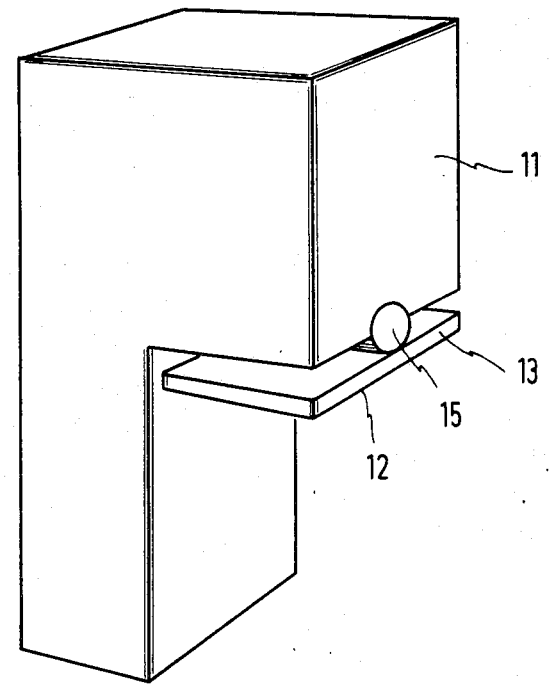

FIGS. 3 and 4 show embodiments in which the chucking force is transferred to the jaw plate 13 by bolsters. These bolsters, which run parallel to the axis of curvature of the workpiece surface, can be partially embedded into the jaw and fastened by cementing.

I claim:

1. A jaw for a radially operative chucking device for a workpiece having a convexly curved surface, comprising: a jaw body; a single jaw plate having a planar surface for contacting the convexly curved surface along one line or narrow strip essentially in the middle of the plate, said jaw plate being hard, but flexible and unsupported under said one line or narrow strip against the jaw body; and two essentially incompressible narrow members arranged between and connected to said jaw body and said jaw plate, and spaced from said line or narrow strip, each narrow member having an axis parallel to said line and perpendicular to the radial, operative direction of the chucking device, whereby said jaw plate upon engagement with the workpiece will bend, but be non-compressed about an axis parallel to said line or narrow strip, so that said line or narrow stip which is in contact with the workpiece will become broader.

2. A jaw for a radially operative chucking device for a workpiece having a concavely curved surface, comprising: a jaw body; a single jaw plate having a planar surface for contacting the concavely curved surface along two lines or narrow strips at edges of the jaw plate, said jaw plate being hard, but flexible and unsupported under said two lines or narrow strips; and a single narrow essentially incompressible member arranged between and connected to said jaw body and said jaw plate and spaced from said lines or narrow strips, said member having an axis parallel to said lines and perpendicular to the radial operative direction of the chucking device, whereby said jaw plate upon engagement with the workpiece will bend but be non-compressed about an axis parallel to said two lines or narrow strips, so that said lines or narrow strips in contact with the workpiece will become broader.

3. A jaw according to claim 1 or 2, wherein said member is a web, and said jaw plate, web, and jaw body are integrally connected.

4. A jaw according to claim 1 or 2, wherein said member is a bolster partially embedded in the jaw body.

5. A jaw according to claim 4, wherein the bolster is cylindrical.

6. A jaw according to claim 1 or 2, wherein a foam material insert is disposed between the jaw body and jaw plate.

7. A jaw according to claim 6, wherein the foam material insert is cemented to the jaw body and jaw plate.

* * * * *